(12) United States Patent
Crouse et al.

(10) Patent No.: US 11,794,706 B2
(45) Date of Patent: Oct. 24, 2023

(54) SAFETY AND CONTROL SYSTEM FOR USE WHEN PULLING TRAILERS

(71) Applicants: Daniel H. Crouse, Warren, OH (US); Steven A. Musick, Warren, OH (US)

(72) Inventors: Daniel H. Crouse, Warren, OH (US); Steven A. Musick, Warren, OH (US)

( * ) Notice: Subject to any disclaimer, the term of this patent is extended or adjusted under 35 U.S.C. 154(b) by 363 days.

(21) Appl. No.: 17/365,412

(22) Filed: Jul. 1, 2021

(65) Prior Publication Data
US 2023/0001897 A1 Jan. 5, 2023

(51) Int. Cl.
| | | |
|---|---|---|
| *B60T 8/17* | (2006.01) | |
| *B60L 7/18* | (2006.01) | |
| *B60T 8/24* | (2006.01) | |
| *B60T 8/1755* | (2006.01) | |
| *B60D 1/62* | (2006.01) | |
| *B60D 1/32* | (2006.01) | |
| *B60T 1/10* | (2006.01) | |

(52) U.S. Cl.
CPC ............ *B60T 8/1708* (2013.01); *B60D 1/322* (2013.01); *B60D 1/62* (2013.01); *B60L 7/18* (2013.01); *B60T 1/10* (2013.01); *B60T 8/1755* (2013.01); *B60T 8/248* (2013.01); *B60L 2200/28* (2013.01); *B60L 2220/44* (2013.01); *B60T 2230/06* (2013.01)

(58) Field of Classification Search
CPC ... B60T 2230/06; B60T 8/1708; B60D 1/322; B60D 1/62; B62D 59/00; B62D 59/04; B60L 2200/28

See application file for complete search history.

(56) References Cited

U.S. PATENT DOCUMENTS

| | | | |
|---|---|---|---|
| 3,948,544 A | * | 4/1976 Presley | B60T 7/20 188/112 A |
| RE30,550 E | * | 3/1981 Reise | B60T 13/74 188/112 A |

(Continued)

FOREIGN PATENT DOCUMENTS

WO 2010146497 6/2010

OTHER PUBLICATIONS

Sibi Visht Sankara Narayanan, et al., Design and Control of Vehicle Trailer with Onboard Power Supply, SAE Int. J. Paasen. Cars—Electron. Syst., Apr. 4, 2015, pp. 32-40, vol. 8 Issue 1.

*Primary Examiner* — Tony H Winner
*Assistant Examiner* — Hosam Shabara
(74) *Attorney, Agent, or Firm* — SAND, SEBOLT & WERNOW CO., LPA

(57) ABSTRACT

A towing device operably provided on a trailer for powering and controlling the trailer. The towing device has an actuator operably connected with the trailer during a towing operation. The towing device also has at least one switch provided in the actuator and operable to variably control at least one motor/generator provided on the trailer. The at least one switch is also operable to send a first signal to the at least one motor/generator via a first force exerted on the actuator by a vehicle, and wherein a first torque is applied to at least one wheel on the trailer via the at least one motor/generator being operably engaged with the at least one wheel. In addition, the towing device may include a controller operably connected to the at least one switch and to the at least one motor/generator, to control the torque applied by the at least one motor/generator.

19 Claims, 8 Drawing Sheets

(56) References Cited

U.S. PATENT DOCUMENTS

| | | | | |
|---|---|---|---|---|
| 4,475,612 | A | * | 10/1984 | Anderson .............. B62D 59/04 280/476.1 |
| 4,625,821 | A | * | 12/1986 | Aumont ................ B60K 17/10 60/449 |
| 4,771,838 | A | * | 9/1988 | Ketcham ................ B62D 13/00 180/6.62 |
| 6,788,504 | B2 | | 9/2004 | Vanderkok |
| 7,743,859 | B2 | | 6/2010 | Forsyth |
| 8,215,436 | B2 | | 7/2012 | DeGrave et al. |
| 8,365,849 | B2 | | 2/2013 | Bartel |
| 9,037,346 | B2 | * | 5/2015 | Keys, II ................ B62D 59/04 701/1 |
| 10,183,563 | B2 | | 1/2019 | Rayner et al. |
| 10,538,240 | B2 | * | 1/2020 | Cervantes ................ B60D 1/62 |
| 11,052,769 | B2 | * | 7/2021 | Vande Haar ......... B60K 7/0015 |
| 2013/0079980 | A1 | * | 3/2013 | Vuk ....................... B62D 59/04 701/36 |

\* cited by examiner

SAFETY AND CONTROL SYSTEM FOR USE WHEN PULLING TRAILERS

TECHNICAL FIELD

This present disclosure generally relates to trailers. More particularly, the present disclosure relates to smart trailers. Specifically, the present disclosure relates to a towing device and associated components provided on a trailer for applying torque and regenerative braking to at least one wheel on the trailer during towing operations.

BACKGROUND

Historically, a trailer, other towed vehicles, or the like, are forwardly and rearwardly controlled by a vehicle, such an automobile or truck, during a towing operation. The vehicle, generally, initiates the movement of the trailer when the vehicle and the trailer are at rest. During such initiation of movement, the vehicle experiences a significant reduction in both performance and fuel economy (i.e., the range per load of fuel) when towing a loaded trailer. For example, the performance of the vehicle may be hindered and/or negatively affected when the trailer is being pulled up an incline (e.g., a hill) by the vehicle during a short period of towing to a prolonged period of towing. As such, the movement of the trailer is completely controlled by the efforts of the vehicle.

In addition, the speed of the trailer is generally reduced by the braking force caused by the vehicle. In other words, the braking system provided on the vehicle must reduce speed to both the vehicle and the trailer. While some trailers include braking systems, such braking systems only provide collective braking to all wheels on the trailer simultaneously. Such collective braking on the trailer could cause the trailer to sway and/or "fishtail" where the vehicle may lose control over the trailer.

SUMMARY

The current trailers fail to provide solutions to avoid loss in performance, control, safety, and fuel economy in the vehicle while pulling a trailer. As such, continuous unmet needs have been presented for providing a trailer while avoiding loss in performance, control, safety, and fuel economy in the vehicle while pulling a trailer. The embodiments described and illustrated herein have provided solutions to the continuous unmet needs for providing a trailer while avoiding loss in performance, control, safety, and fuel economy in the vehicle while pulling a trailer. Aspects of the present disclosure are directed to these continuous unmet needs.

In one aspect, an exemplary embodiment of the present disclosure may provide a towing device that is operably provided on a trailer. The towing device has an actuator operably connected with the trailer. The towing device also has at least one switch provided in the actuator and operable to variably control at least one motor/generator provided on the trailer. The at least one switch is operable to send a first signal to the at least one motor/generator via a first force exerted on the actuator by a vehicle, and wherein a first torque is applied to at least one wheel on the trailer via the at least one motor/generator being operably engaged with the at least one wheel.

This exemplary embodiment or another exemplary embodiment may further provide a controller operably connected to the at least one switch and to the at least one motor/generator, wherein the controller is operable to control the torque applied by the at least one motor/generator when the at least one switch sends the first signal. This exemplary embodiment or another exemplary embodiment may further provide that the actuator further comprises a housing having a first end, a second opposing end, and a central chamber defined by the housing that extends between the first and second ends of the housing; a piston moveably disposed inside of the central chamber defined by the housing; and a piston rod operably connected to the piston for moving the piston inside of the central chamber, wherein the piston rod operably engages a coupler of the trailer. This exemplary embodiment or another exemplary embodiment may further provide a fluid reservoir operably connected to the actuator that is in fluid communication with the central chamber defined by the housing, the fluid reservoir having first and second passages for allowing fluid into a first location and an opposed second location inside of the central chamber. This exemplary embodiment or another exemplary embodiment may further provide that the at least one switch further comprises a second switch provided in the actuator and operable to variably control the at least one motor/generator, wherein the second switch is operable to send a second signal to the at least one motor/generator via an opposed second force exerted on the actuator by a vehicle, and wherein an opposed second torque is applied to the at least one wheel on the trailer via the at least one motor/generator. This exemplary embodiment or another exemplary embodiment may further provide that the at least one switch further comprises a third switch provided on the actuator and operably connected to the at least one motor/generator and the vehicle, wherein the third switch sends a third signal to the controller via a braking force applied by the vehicle, wherein torque is prevented to the at least one wheel on the trailer via the at least one motors/generators. This exemplary embodiment or another exemplary embodiment may further provide that the at least one switch is provided proximate to the first end of the housing and is disposed inside of a first vertical chamber this is in fluid communication with the central chamber; and wherein the second switch is provided proximate to the second end of the housing inside of a second vertical chamber and is in fluid communication with the central chamber. This exemplary embodiment or another exemplary embodiment may further provide a biaser operably connected to the piston rod, the biaser is operable for biasing the piston such that the piston fails to apply any pressurized cavities inside the central chamber of the housing when the actuator is free of any force exerted by the vehicle. This exemplary embodiment or another exemplary embodiment may further provide a set of sensors provided on the towing device and operably connected to the controller for correcting the yaw of the trailer, wherein the set of laser sensors is directed towards the rear corners of the vehicle for preventing yaw of longitudinal and transverse axes defined by the trailer measured relative to the rear corners of the vehicle.

In another aspect, an exemplary embodiment of the present disclosure may provide a method of controlling a trailer via a towing device. The method comprises the steps of applying a first force, via a vehicle towing the trailer, to a piston rod of an actuator of the towing device; actuating a piston of the actuator, via the piston rod, to a first end of the actuator of the towing device; pressurizing a central chamber and a first vertical chamber defined by the actuator of the towing device, wherein at least one switch is disposed inside of the first vertical chamber; sending a first signal, via the at least one switch, to at least one motor/generator based on the pressure being applied to the at least one switch; and applying a first variable torque, via the at least one motor/generator, to at least one wheel operably connected to the trailer.

This exemplary embodiment or another exemplary embodiment may further provide the step of sending the first signal, via the at least one switch, to a controller based on the pressure being applied to the first switch. This exemplary embodiment or another exemplary embodiment may further provide the step of moving a volume of hydraulic fluid into a first passage of a fluid reservoir of the actuator of the towing device. This exemplary embodiment or another exemplary embodiment may further provide the step of applying a second opposing force, via the vehicle towing the trailer, to the piston rod of the actuator of the towing device. This exemplary embodiment or another exemplary embodiment may further provide the step of actuating the piston of the actuator, via the piston rod, to a second opposing end of the actuator of the towing device. This exemplary embodiment or another exemplary embodiment may further provide the step of pressurizing the central chamber and a second vertical chamber of the actuator of the towing device, wherein a second switch of the at least one switch is disposed inside of the second vertical chamber. This exemplary embodiment or another exemplary embodiment may further provide the step of sending a second signal, via the second switch, to a controller based on the pressure being applied to the second switch. This exemplary embodiment or another exemplary embodiment may further provide the step of applying an opposed second variable torque, via the at least one motor/generator, to the at least one wheel operably connected to the trailer. This exemplary embodiment or another exemplary embodiment may further provide the step of moving a volume of the hydraulic fluid into a second passage of a fluid reservoir of the actuator of the towing device. This exemplary embodiment or another exemplary embodiment may further provide the step of storing electrical energy to an on-board energy storage device by capturing electrical energy from one of the first and second motors/generators. This exemplary embodiment or another exemplary embodiment may further provide the step of correcting yaw of longitudinal and transverse axes of the trailer, via a set of sensors, measured relative to the rear corners of the vehicle. This exemplary embodiment or another exemplary embodiment may further provide that the step of applying a first variable torque, via the at least one motor/generator, to at least one wheel operably connected to the trailer is accelerating torque caused by the at least one motor/generator. This exemplary embodiment or another exemplary embodiment may further provide that the step of applying an opposed second variable torque, via the at least one motor/generator, to at least one wheel operably connected to the trailer is regenerative braking caused by the at least one motor/generator.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
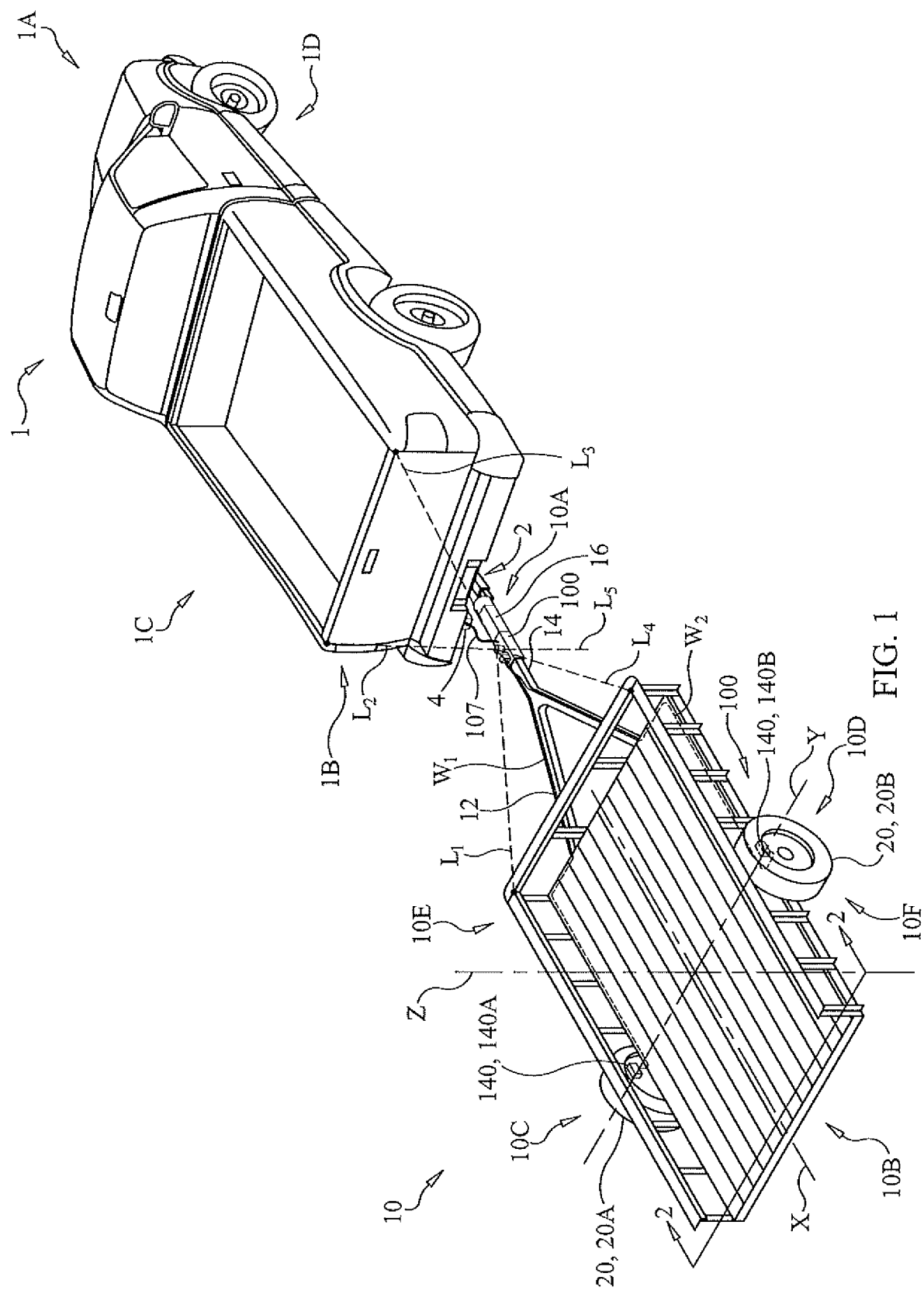
FIG. 1 illustrates a perspective isometric view of a vehicle towing a trailer, wherein the trailer includes a towing device electrically connected to at least one motor/generator.

FIG. 1 illustrates a vehicle, which is generally indicated by the reference number 1. It will be understood that the illustrated vehicle 1 is exemplary only and any type of vehicle is contemplated to be represented by the illustrated device. Such vehicles considered suitable herein include motorcycles, all-terrain vehicles, cars, sport utility vehicles (SUV), pickup trucks, vans, recreational vehicles, commercial trucks, semi-trucks, and other similar vehicles for the purpose of towing.

As illustrated in FIG. 1, the vehicle 1 has a front end 1A, a rear end 1B that opposes the front end 1A, a first side 1C, and a second side 1D that opposes the first side 1C. The vehicle 1 also includes a towing hitch 2 that is disposed at the rear end 1B of the vehicle 1. The vehicle 1 also includes a towing electrical connector 4 that is disposed at the rear end 1B of the vehicle 1 and proximate to the towing hitch 2. The towing electrical connector 4 is electrically connected to associated electrical components in the vehicle 1 for towing capabilities (e.g., brake lights, turn-signal lights, etc.).

Still referring to FIG. 1, the vehicle 1 is mechanically connected to a trailer 10, which is generally indicated by the reference number 10. It will be understood that the illustrated trailer 10 is exemplary only and any type of trailer is contemplated to be represented by the illustrated device. Such trailers considered suitable herein include boat trailers, car-hauler trailers, enclosed trailers, flatbed trailers, gooseneck trailers, dump trailers, horse trailers, livestock trailers, tilt trailer, travel/camper trailers, utility trailers, and other similar trailers for the purpose of being towed.

As illustrated in FIG. 1, the trailer 10 has a front end 10A, directed towards the rear end 1B of the vehicle 1 and a rear end 10B opposite to the front end 10A and facing away from the vehicle 1. The front and rear ends 10A, 10B defines a longitudinal direction therebetween where the vehicle 1 and the trailer 10 travel forwardly and backwardly along the longitudinal direction. The trailer 10 also has a first side 10C and a second side 10D opposite to the first side 10C. The first and second sides 10C, 10D defines a transverse direction therebetween where the vehicle 1 and the trailer 10 travel laterally (i.e., turning left and/or right) along the transverse direction. The trailer 10 also has a top end 10E and a bottom end 10F opposite to the top end 10E. The top and bottom ends 10E, 10F defines a vertical direction therebetween. The trailer 10 also defines a longitudinal axis "X" between the front and rear ends 10A, 10B, a transverse axis "Y" between the first and second sides 10C, 10D, and a vertical axis "Z" between the top and bottom ends 10E, 10F.

Figure 2:
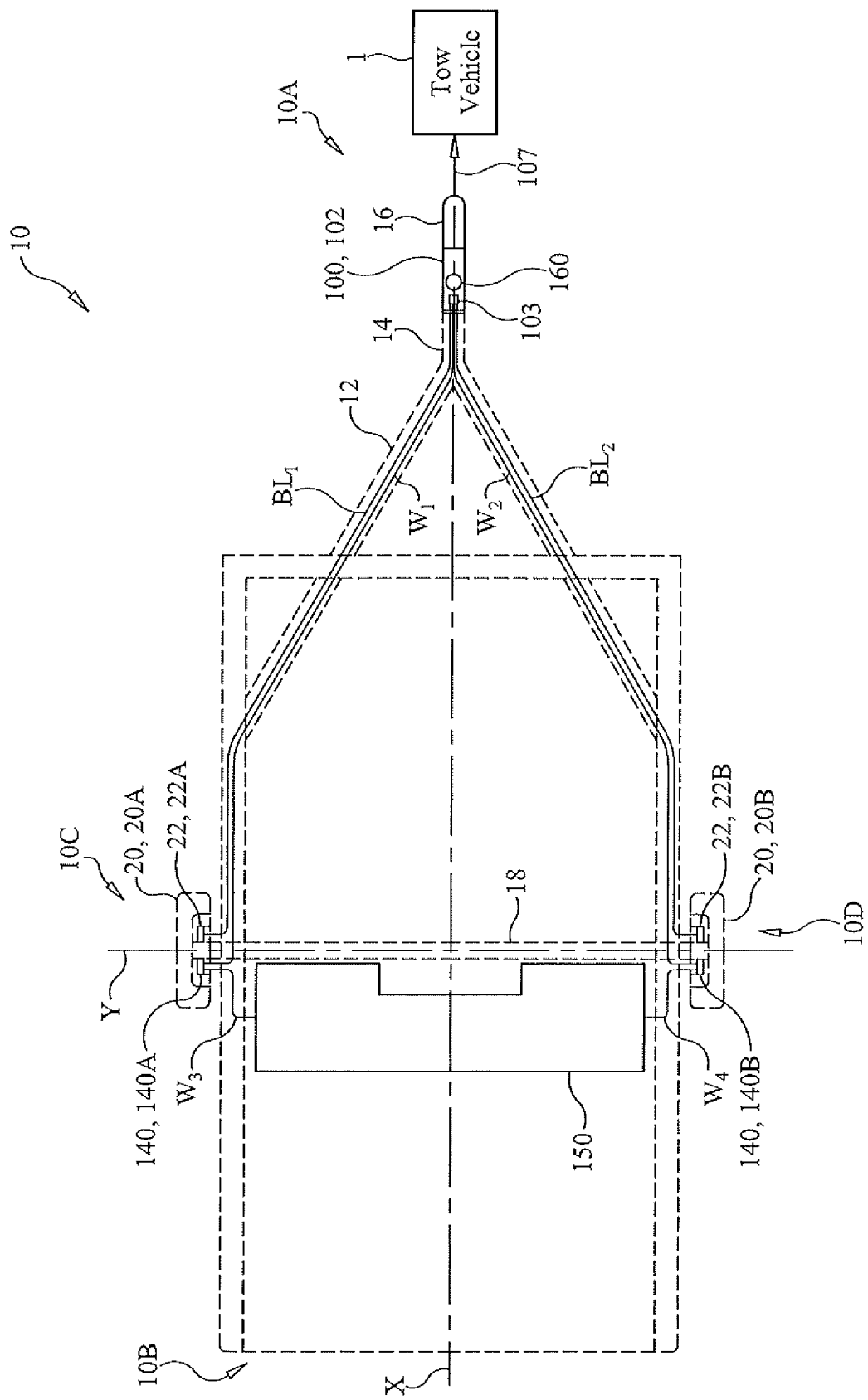
FIG. 2 illustrates a top section plan view of the trailer taken in the direction of line 2-2 in FIG. 1.

Referring to FIGS. 1 and 2, the trailer 10 includes a frame 12 that extends from the front end 10A of the trailer 10 to the rear end 10B of the trailer 10. The frame 12 defines a tongue 14 that extends from the first end 10A of the trailer 10 towards the rear end 10B of the trailer 10 until the frame 12 bifurcates into two portions. The trailer 10 includes a coupler 16 that is mechanically secured to the tongue 14 of the frame 12 at the front end 10A of the trailer 10. The coupler 16 allows the trailer 10 to be towed by the vehicle 1 such that the coupler 16 is operably engaged to the hitch 2 of the vehicle 1. The coupler 16 may be of any suitable coupler and/or yoke that may operably engage a trailer, such as trailer 10, to a vehicle, such as vehicle 1. In one exemplary embodiment, as illustrated in FIG. 1, the coupler 16 may be a ball-style coupler and mechanically couples to the hitch 2 that may be a ball-style hitch. In another exemplary embodiment, the coupler 16 may be a fifth-wheel trailer coupler and mechanically couples to the hitch 2 that may be a fifth-wheel trailer hitch.

As illustrated in FIG. 2, the trailer 10 includes an axle 18 that is disposed between the first and second sides 10C, 10D of the trailer and parallel with the transverse axis "Y". The axle 18 operably engages the first and second portions of the frame 12 and operably connects to at least one wheel. In the illustrated embodiment, the axle 18 operably connects to a pair of wheels 20 at the first and second sides 10C, 10D of the trailer 10. A first wheel 20A of the pair of wheels 20 is provided on the first side 10C of the trailer 10, and a second wheel of the pair of wheels 20 is provided on the second side 10D of the trailer 10. In addition, a mechanical brake assembly 22A, 22B (referred to as "mechanical brakes" hereafter) is operably engaged to each wheel 20A, 20B of the pair of wheels 20 to provide a braking force to the trailer 10. Such braking force provided to the mechanical brakes 22A, 22B is described in further detail below.

While the trailer 10 has a pair of wheels 20 and a mechanical brake 22 operably engaged to each wheel in the pair of wheels 20, any suitable trailer configuration may be used with any suitable numbers of wheels and mechanical brakes. In one exemplary embodiment, a trailer may have a single wheel and a single mechanical brake operably engaged to said wheel. In another exemplary embodiment, a trailer may have a four wheel and a mechanical brake operably engaged to each wheel on the trailer. In another exemplary embodiment, a trailer may have at least one wheel with no mechanical brakes attached to the at least one wheel.

Referring to FIGS. 1 and 2, the trailer 10 also includes a towing device, generally indicated by the reference number 100. The towing device 100 is mechanically connected to the coupler 16 on the frame 12 to allow the coupler 16 to transfer the exerted force from the vehicle 1 to the towing device 100. Such transferring of exerted force from the vehicle 1 to the towing device 100 is described in further detail below. The towing device 100 includes an actuator 102, a controller 103, a first switch 104A, a second switch 104B, a third switch 104C, and a wiring harness 106.

Figure 3:
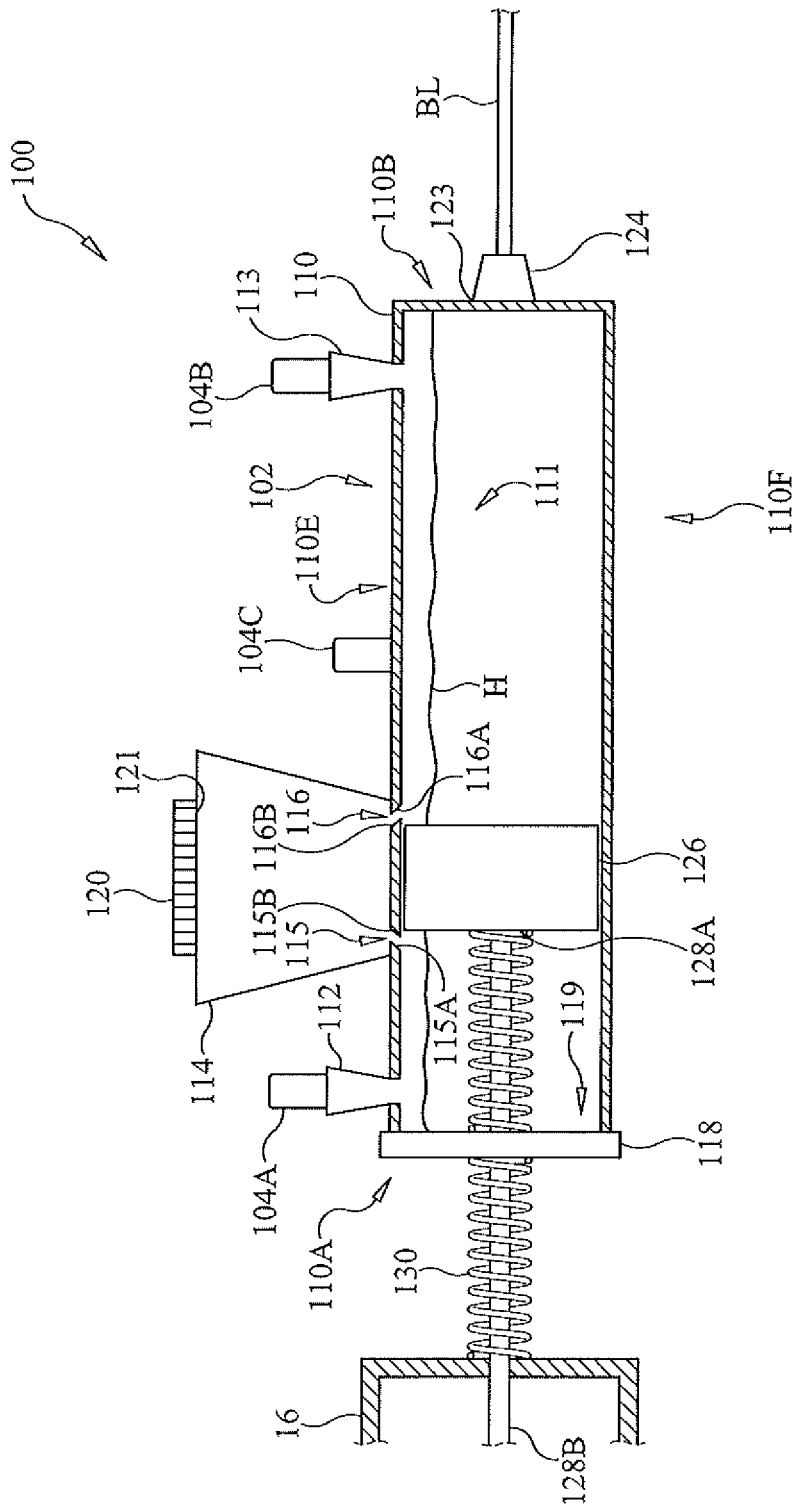
FIG. 3 illustrates a side section elevation view of the towing device, wherein the towing device is provided in a neutral and/or coasting stage.

As illustrated in FIG. 3, the actuator 102 includes a housing 110. The housing 110 includes a front end 110A that faces towards the front end 10A of the trailer 10 and faces towards the rear end 1B of the vehicle 1, a rear end 110B that faces towards the rear end 10B of the trailer 10, a top end 110E that faces the top end 10E of the trailer 10, and a bottom end 110F that faces the bottom end 10F of the trailer. The housing 110 also defines a central chamber 111 that extends between the front and rear ends 110A, 110B of the housing 110. The housing 110 also defines a first vertical chamber 112 that is disposed proximate the front end 110A of the housing 110 and a second vertical chamber 113 that is disposed proximate the rear end 110B of the housing 110. Each of the first and second vertical chambers 112, 113 extends away from the central chamber 111 and towards the top end 110E of the housing 110.

The actuator 102 also includes a fluid reservoir 114 that is disposed exterior to the central chamber 111 and towards the top end 110E of the housing 110. The fluid reservoir 114 and the central chamber 111 are in fluid communication with each other via first and second passages 115, 116 in which the first passage 115 is disposed proximate the front end 110A of the housing 110 and the second passage 116 is disposed proximate the rear end 110B of the housing 110. The first passage 115 is defined by a first opening 115A defined by the housing 110 and a first aperture 115B defined by the fluid reservoir 114. The second passage 116 is defined by a second opening 116A defined by the housing 110 and a second aperture 116B defined by the fluid reservoir 114. In addition, the fluid reservoir 114 and the housing 110 are filled with a hydraulic fluid "H" for creating pressure differentials at different locations along the actuator 102, which are described in more detail below.

The actuator 102 also includes a housing cap 118 that is operably engaged to housing 110 at the front end 110A of the housing 110. The housing cap 118 provides cover over a front opening 119 defined by the housing 110 that provides access to the central chamber 111. The housing cap 118 prevents any hydraulic fluid "H" from escaping and/or exiting from the central chamber 111 at the front end 110A of the housing 110. The actuator 102 also includes a fluid reservoir cap 120 that is operably engaged to the fluid reservoir 114 to cover a top opening 121 defined by the fluid reservoir 114. During use, a user of the towing device 100 may remove the fluid reservoir cap 120 to add more hydraulic fluid "H" into the fluid reservoir 114 if desired when the volume of hydraulic fluid "H" is low.

The actuator 102 also include a brake line "BL" that operably engage to the housing 110 at the rear end 110B of the housing 110. The brake line "BL" is in fluid communication with the central chamber 111 of the housing 110 via a rear opening 123 defined by the housing 110. The brake line "BL" is operably coupled to the housing 110 via a coupler 124 disposed about the brake line "BL" and the rear opening 123 of the housing 110. Such communication between the brake line "BL" and the housing 110 allows the actuator 102 to send hydraulic fluid "H" from the actuator 102 to the mechanical brakes 22 to provide braking force on the wheels 20 of the trailer 10. As illustrated in FIG. 2, the brake line "BL" bifurcates into a first brake line "$BL_1$" and a second brake line "$BL_2$". In the illustrated embodiment, the first brake line "$BL_1$" operably connects the actuator 102 to the first mechanical brake 22A on the trailer 10, and the second brake line "$BL_2$" operably connects the actuator 102 to the second mechanical brake 22B of the trailer 10. In other illustrated embodiments, the brake line "BL" may branch off to more than two brake lines depending upon the size, shape, and configuration of a trailer that has more than two wheels with an associated mechanical brake operably attached to each wheel.

The actuator 102 also includes a piston 126 that is connected to a piston rod 128. The piston 126 is moveably disposed inside of the central chamber 111 of the housing 110 between the first and second ends 110A, 110B of the housing. The piston 126 is operably connected to a first end 128A of the piston rod 128, and the coupler 16 is operably connected to a second opposing end 128B of the piston rod 128. Having the piston rod 128 being operably connected to both the coupler 16 and the piston 126 allows the piston rod 128 to transfer any exerted force from the vehicle 1 to the towing device 100 during a towing operation. Such transfer of exerted force during a towing operation is described in more detail below. In addition, a biaser 130 is circumferentially disposed about the piston rod 128 between the first and second ends 128A, 128B of the piston rod 128. The biaser 130 is operably engaged to the coupler 16 proximate the front end 10A of the trailer 10 and operably engaged to the piston 126 inside of central chamber 111 of the housing 110 proximate the rear end 10B of the trailer 10. The biaser 130 naturally biases the piston 126 and the piston rod 128 between the first and second passages 115, 116 when the vehicle 1 fails to exert a pulling or pushing force against the actuator 102, which is described in more detail below. In one exemplary embodiment, the biaser 130 may be a coil spring (as illustrated in FIG. 3). In another exemplary embodiment, the biaser 130 may be any suitable device and/or component that provides biasing means to the piston 126 and the piston rod 128.

Still referring to FIG. 3, the towing device 100 includes at least one switch 104. In the illustrated embodiment, however, the towing device 100 includes first, second, and third switches 104A, 104B, 104C. The first switch 104A is disposed inside of the first vertical chamber 112, and the second switch 104B is disposed inside of the second vertical chamber 113, and the third switch 104C is disposed exterior to the central chamber 111. Each of the first and second switches 104A, 104B may be in contact with the hydraulic fluid "H" depending on the position of the piston 126 during a towing process. In other words, the first and second switches 104A, 104B may be under pressure depending upon the interaction between the hydraulic fluid "H" and the piston 126 during a towing process. The third switch 104C is independent of the hydraulic pressure caused by the hydraulic fluid "H" and the piston 126 inside of the central chamber 111 and the first and second vertical chambers 112, 113. Rather, the third switch 104C is electrically connected to the vehicle 1 via the wiring harness 106 electrically connecting the towing device 100 and its associated electrical components to the vehicle 1. In addition, the first, second, and third switches 104A, 104B, 104C are electrically connected to the controller 103 such that each of the first, second, and third switches 104A, 104B, 104C may communicate with the controller 103.

As illustrated in FIGS. 1 through 3, the controller 103 may be provided on the towing device 100 exterior to the actuator 102. As described previously, the controller 103 of the towing device 100 electrically connects to each of the first, second, and third switches 104A, 104B, 104C of the towing device 100 for relaying and communicating information to other electrical components provided in the trailer 10. For example, the controller 103 relays and communicates with at least one motor/generator 140 that operably engages to the wheels 20A, 20B on the trailer 10 (seen in FIGS. 1 and 2). As such, the controller 103 may control the at least one motor/generator 140 through the outputs provided by the first, second, and third switches 104A, 104B, 104C during a towing process. In the illustrated embodiment, the at least one motor/generator 140 has a first motor/generator 140A and a second motor/generator 140B that may be controlled via the controller 103.

The controller 103 may have any suitable number of electrical components to perform methods and/or commands during a towing operation. In one exemplary embodiment, the controller 103 may include a processor that may perform methods and/or operations based on sensed inputs from certain input devices (e.g., first, second, and third switches 104A, 104B, 104C). In this exemplary embodiment, the methods and/or commands made and determined by the controller 103 may be proportional based on the sensed inputs in which certain commands may be hard responses or may be pulse responses while monitoring the effect of such command. In another exemplary embodiment, the controller 103 may include a global positioning system ("GPS") and memory system for anticipating road conditions where the vehicle 1 and the trailer 10 are currently traveling or where the vehicle 1 and the trailer 10 will be traveling. In another exemplary embodiment, the controller 103 may include a state of charge device for an energy storage device for potential safety/security features.

In the illustrated embodiment, the first, second, and third switches 104A, 104B, 104C provide certain features to the towing device 100 for controlling the speed and movement of the trailer 10 via the first and second motors/generators 140A, 140B. Such controlling of speed and movement of the trailer 10 is dependent upon the driving inputs provided by the user (i.e., driver) driving the vehicle 1.

The first switch 104A may be a pressure transducer, such as a potentiometer, that applies variable power to the controller 103 where the controller 103 is allowed to control first and second motors/generators 140A, 140B that are operably engaged to the wheels 20A, 20B. As described in further detail below, the first switch 104A allows the controller 103 to control the forward motion of the wheels 20A, 20B and apply an accelerating torque via the first and second motors/generators 140A, 140B when acceleration is needed for the trailer 10.

The second switch 104B may be a surge braking power safety switch that may enable or disable power to the first and second motors/generators 140A, 140B via the controller 130 where the controller 103 is able to control the first and second motors/generators 140A, 140B that are operably engaged to the wheels 20A, 20B. In one situation, the second switch 104B may allow the controller 103 to disengage power to the first and second motors/generators 140A,140B such that the first and second motors/generators 140A,140B may apply regenerative braking to the wheels 20A, 20B. In another situation, the second switch 104B may allow the controller 103 to engage power to the first and second motors/generators 140A,140B and to control the motion of the wheels 20A, 20B via the first and second motors/generators 140A, 140B by supplemental braking (if needed) in conjunction with the mechanical brakes 22A, 22B.

The third switch 104C is a brake light power switch that receives inputs from the braking light switches provided on the vehicle 1 and outputs information to the controller 103 based on the braking light switches from the vehicle 1 for regenerative or supplemental braking purpose. The uses of the first, second, and third switches 104A, 104B, 104C during different stages of towing are described in more detail below.

In the illustrated embodiment, the first and second motors/generators 140A, 140B operably engage the first and second wheels 20A, 20B on the trailer 10. As illustrated in FIGS. 1 and 2, the first and second motors/generators 140A, 140B operably connect to the controller 103 via first and second wires $W_1$, $W_2$. As to the first wire $W_1$, the first wire $W_1$ electrically connects the controller 103 to the first motor/ generator 140A such that any power and/or signals sent by the first, second, and third switches 104A, 104B, 104C to the controller 103 may be outputted to the first motor/generator 140A. As the second wire $W_2$, the second wire $W_2$ electrically connects the controller 103 to the second motor/generator 140B such that any power and/or signals sent by the first, second, and third switches 104A, 104B, 104C to the controller 103 may be outputted to the second motor/generator 140B. The controller 103 may independently or collectively control the first and second motors/generators 140A, 140B depending on the towing situation of the trailer 10, which is described in more detail below.

The trailer 10 may also include an energy storage device 150. In one exemplary embodiment, the energy storage device 150 may be a battery that is operable to receive and to hold a charge of electrical energy. In another exemplary embodiment, the energy storage device 150 may be any suitable device that is operable to receive and to hold a charge of electrical energy. The energy storage device 150 is secured to the trailer 10 and is disposed between the first and second wheels 20A, 20B on the trailer 10. In other exemplary embodiments, the energy storage device 150 may be secured and/or positioned at any suitable location on the trailer 10.

The energy storage device 150 is also electrically connected to the first and second motors/generators 140A, 140B via third and fourth wires $W_3$, $W_4$. As to the third wire $W_3$, the third wire $W_3$ electrically connects the energy storage device 150 to the first motor/generator 140A. As to the fourth wire $W_4$, the fourth wire $W_4$ electrically connects the energy storage device 150 to the second motor/generator 140B. Such electrical connection between the motors/generators 140A, 140B and the energy storage device 150 allows the energy storage device 150 to capture and store electrical energy from the first and second motors/generators 140A, 140B during regenerative braking (described in detail below).

In addition, such electrical connection between the motors/generators 140A, 140B and the energy storage device 150 allows the first and/or second motors/generators 140A, 140B and the controller 103 to utilize stored energy from the energy storage device 150 during acceleration or supplemental braking performed by the first and/or second motors/generators 140A, 140B (described in detail below). Moreover, associated electrical components provided in the towing device 100 and the trailer 10 may utilize such stored energy from the energy storage device 150 during a towing process of the trailer 10 by the vehicle 1. While an energy storage device 150 is provided on the trailer 10, the trailer 10 may omit the energy storage device 150 and power all electrical components on the trailer 10 through the energy provided in the vehicle via the wiring harness 106, if desired.

Having now described the vehicle 1, the trailer 10, and the towing device 100 with its associated components, methods of use and operation may now be described and illustrated herein.

As illustrated in FIGS. 1 and 3, the towing device 100 is shown in a neutral stage. In this stage, the vehicle 1 and trailer 20 may be stopped along level terrain or the vehicle 1 and the trailer 20 are traveling at a substantially similar speed (i.e., coasting) in which the trailer 10 is unaffected any pulling or pushing exerted by the vehicle 1. In the neutral stage, as seen in FIG. 3, the piston 126 of the actuator 102 is disposed between the first and second passages 115, 116 of the fluid reservoir 114 due to the piston rod 128 being unaffected by any pulling or pushing force exerted by the vehicle 1. Generally, the piston 126 will naturally bias to the neutral stage due to the biaser 130 biasing the piston 126 between the first and second passages 115, 116. In the neutral stage, each of the first and second switches 104A, 104B is provided in an unpressurized state since the piston 126 is not exerting a force onto the hydraulic fluid "H" inside of the central chamber 111. In this unpressurized state, the first switch 104A is provided in an open electrical stage where no power (or signal) is outputted to the controller 103 for operating the first and second motors/generators 140A, 140B. In this unpressured state, the second switch 104 is also provided in a closed electrical stage where power may be applied to the controller 103 for operating the first and second motors/generators 140A, 140B. In other words, the second switch 104 will not impede the transfer of power between the controller 103 and the motors/generators 140 during a towing process. In one exemplary embodiment, a biaser may be variably controlled during a towing operation when biasing a piston between first and second passages inside of an actuator.

Figure 4:
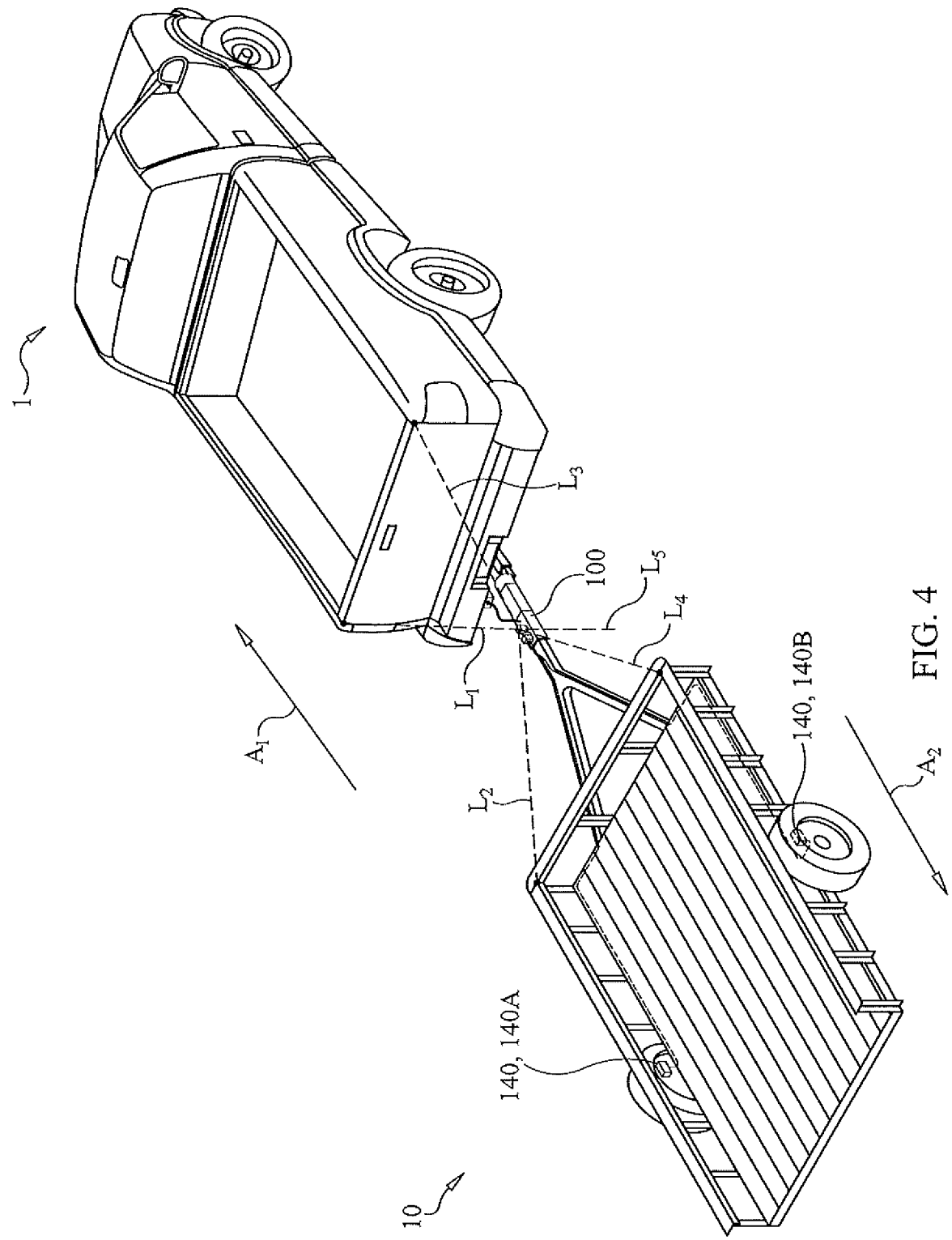
FIG. 4 illustrates a perspective isometric view of the vehicle towing the trailer, wherein the trailer includes the towing device electrically connected to at least one motor/generator, and wherein the vehicle is accelerating.
Figure 5:
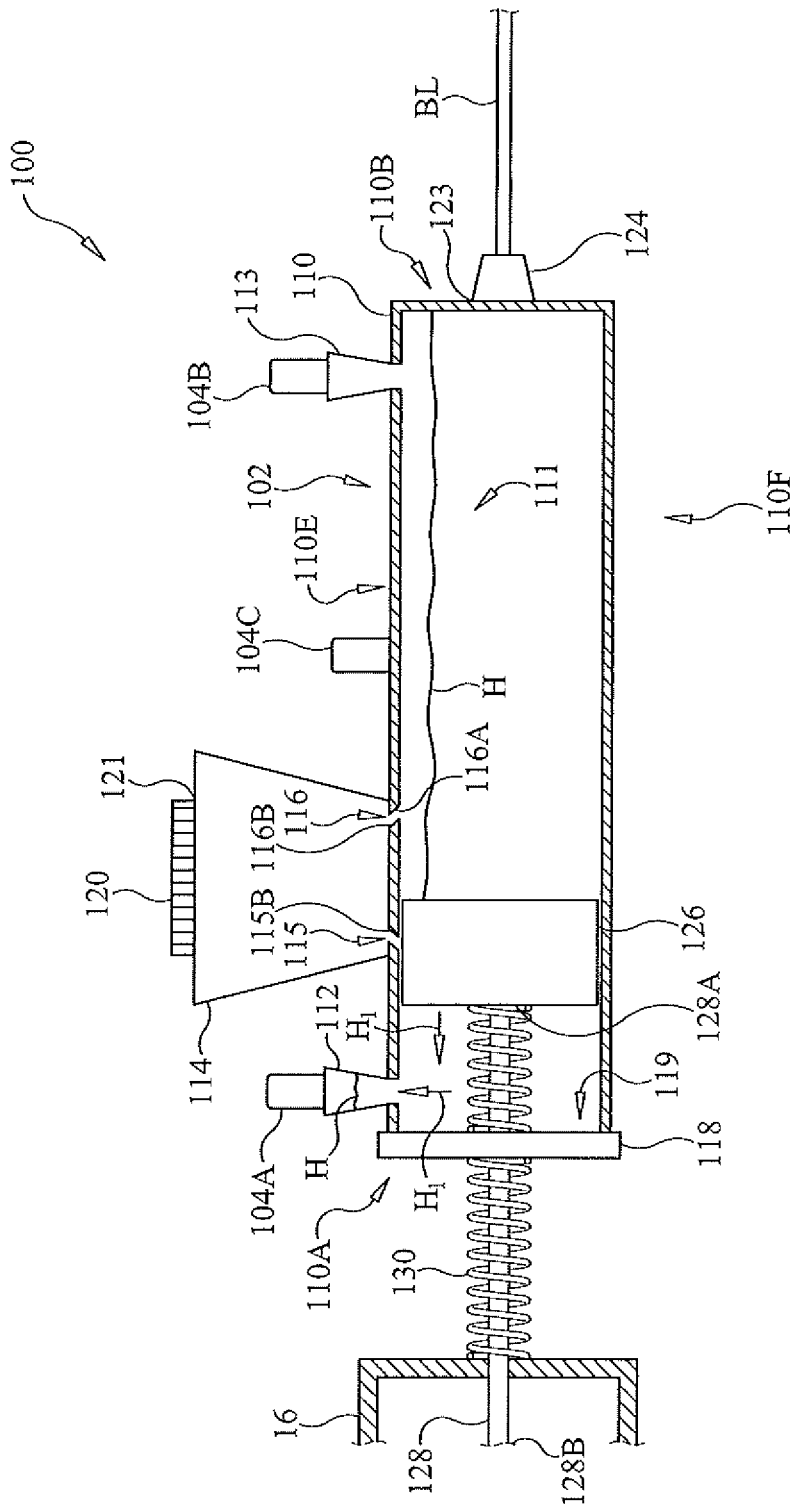
FIG. 5 illustrates a side section elevation view of the towing device, wherein the towing device is provided in an accelerating stage.

As illustrated in FIGS. 4 and 5, the towing device 100 is shown in an accelerating stage. In this stage, the vehicle 1 is accelerating forward and away from the trailer 10, which is denoted by the arrow labeled "$A_1$". In addition, the trailer 10 initially transitions backwards and away from the vehicle 1 as the vehicle 1 begins to accelerate, which is denoted by the arrow labeled "$A_2$". In the accelerating stage, the piston 126 of the actuator 126 is being pulled towards the front end 10A of the trailer 10 due to the piston rod 128 being pulled towards the front end 10A of the trailer 10 by the acceleration of the vehicle 1.

As shown in FIG. 5, a portion of the piston 126 is positioned directly underneath the first passage 115 during acceleration where the piston 126 is covering the first passage 115. As the piston 126 moves away from the neutral stage and towards the first end 110A of the housing 110, a volume of hydraulic fluid "H" is compressed between the piston 126 and the housing cap 118 to create a pressurized cavity. Such pressurized cavity between the piston 126 and the housing cap 118 transitions the hydraulic fluid "H" towards the housing cap 118 and escapes into the first vertical chamber 112 to pressurize the first switch 104A in the accelerating stage (shown by arrows labeled "$H_1$"). In addition, hydraulic fluid "H" that is positioned behind the piston 126 and proximate the second end 110B of the housing 110 transitions into the second passage 116 to prevent the creation of vacuum inside of the actuator 102.

In the accelerating stage, the first switch 104A is pressurized due to the hydraulic fluid "H" being forced into the first vertical chamber 112 via the piston 126 creating a first pressurized state. Once the first pressurized state occurs inside of the first vertical chamber 112, the first switch 104A is provided in a closed electrical stage where power (or a signal) is outputted to the controller 103 for operating the first and second motors/generators 140A, 140B. Such power sent to the controller 103 via the first switch 104A allows the controller 103 to control the forward movement of the wheels 20A, 20B via the first and second motors/generators 140A, 140B. In other words, the power sent to the controller 103 via the first switch 104A allows the controller 103 to control the acceleration of the wheels 20A, 20B via the first and second motors/generators 140A, 140B by applying an accelerating torque to the wheels 20A, 20B. Such forward acceleration allows the trailer 10 to provide a supplemental force to the vehicle 1 in which the trailer 10 is moving itself in conjunction with the forward movement provided by the vehicle 1. As such, the forward acceleration of the trailer 10 via the first and second motors/generators 140A, 140B helps prevent the lack of performance and fuel mileage of the vehicle 1.

During the accelerating stage, the first switch 104A may supply a variable amount of power to the controller 103 that is dependent upon the amount of pulling force exerted by the vehicle 1 onto the coupler 16 of the trailer 10 and the piston rod 128 of the actuator 102. Therefore, as the piston rod 126 transitions towards the first end 110A of the housing 110 and creates a greater pressured cavity between the housing cap 118 and the piston 126, the first switch 104A provides a greater amount of power to the controller 103 such that the first and second motors/generators 140A, 140B provide a greater amount of acceleration to the trailer 10.

Once the vehicle 1 and the trailer 10 are traveling at a substantially similar speed (i.e., coasting) where the piston 126 and the piston rod 128 begin to return the neutral stage (shown in FIG. 3), the first switch 104A progressively reduces power sent to the controller 103. The reduction of power from the first switch 104A to the controller 103 is caused by the reduction in pressure by the piston 126 on the hydraulic fluid "H". The first switch 104A then returns to the open electrical state once the first switch 104A is in an unpressurized state where the piston 126 is positioned between the first and second passages 115, 116. In other words, the first switch 104A terminates power to the controller 103 once the first switch 104A is in an unpressurized state where the piston 126 is positioned between the first and second passages 115, 116 in the neutral stage.

Figure 6:
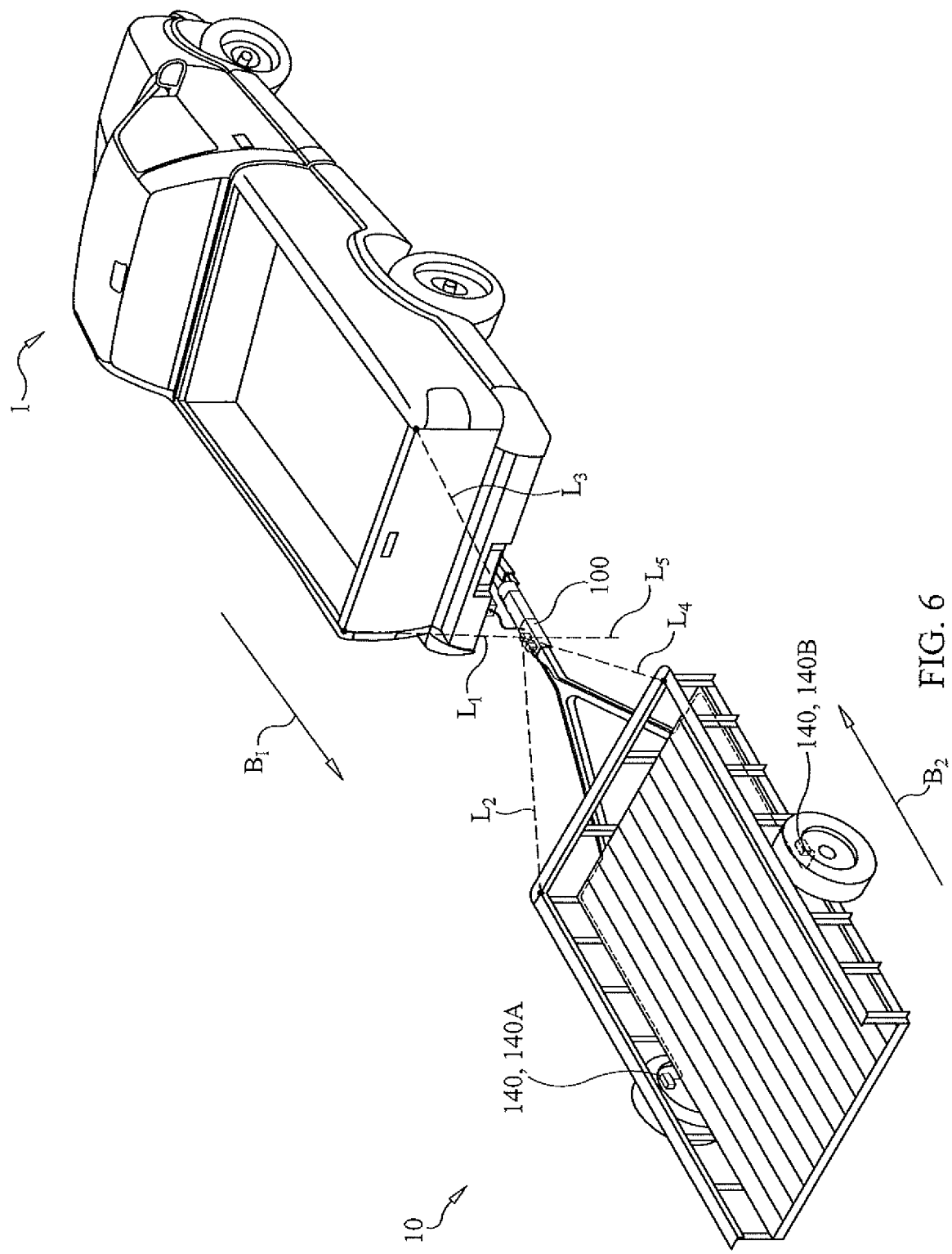
FIG. 6 illustrates a perspective isometric view of the vehicle towing the trailer, wherein the trailer includes the towing device electrically connected to at least one motor/generator, and wherein the vehicle is braking.
Figure 7:
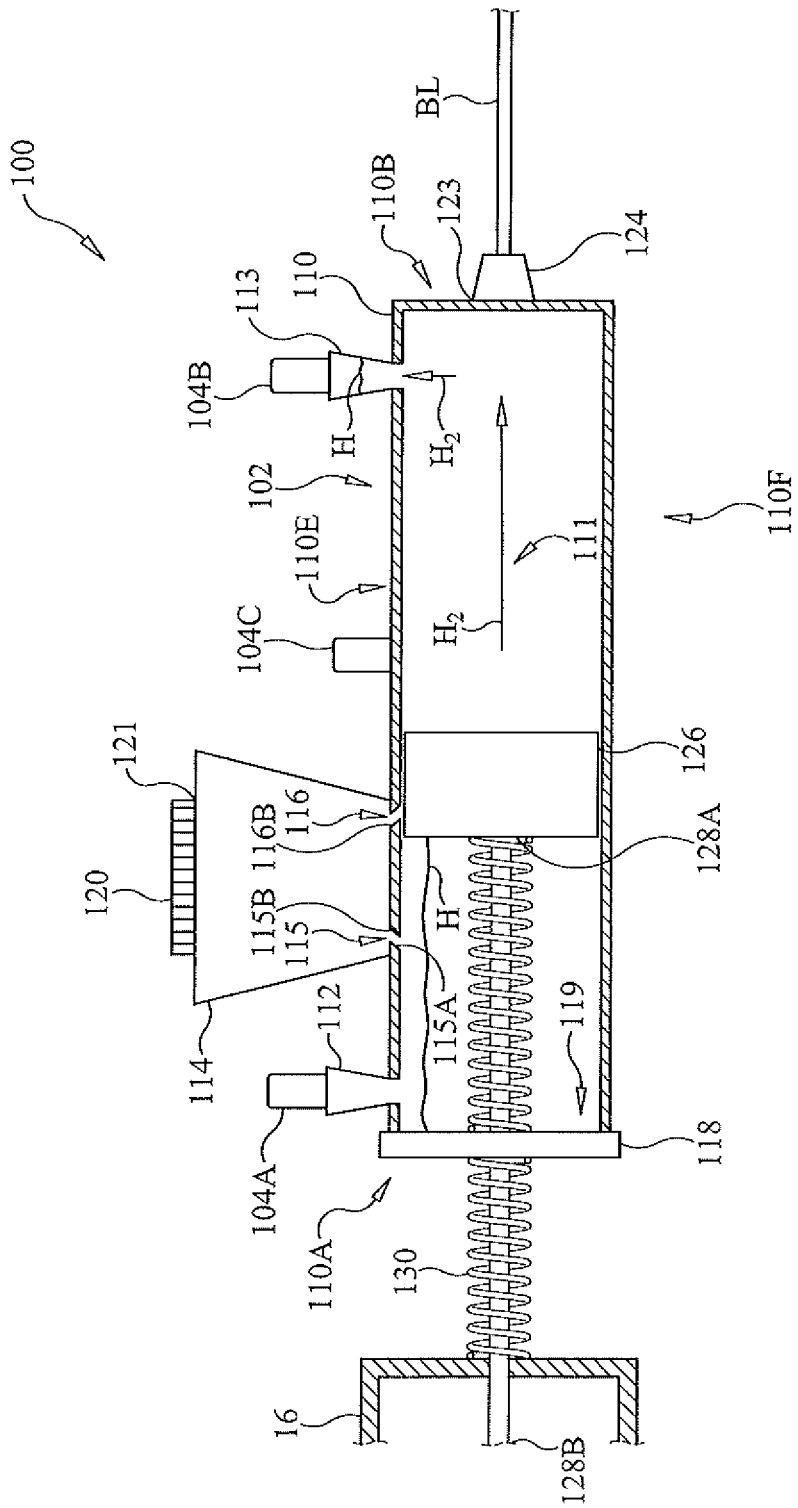
FIG. 7 illustrates a side section elevation view of the towing device, wherein the towing device is provided in a braking/regenerative stage.

As illustrated in FIGS. 6 and 7, the towing device 100 is shown in a braking stage. In this stage, the vehicle 1 is apply a braking force to cause the vehicle 1 to slow down in speed, which is denoted by the arrow labeled "$B_1$". In addition, the trailer 10 transitions forward and towards the vehicle 1 as the vehicle 1 begins to apply a braking force, which is denoted by the arrow labeled "$B_2$".

In the braking stage, the piston 126 of the actuator 102 is being pushed towards the rear end 10B of the trailer 10 due to the braking force being applied by the vehicle 1. During braking, a portion of the piston 126 is positioned directly underneath the second passage 116 such that the piston 126 is covering the second passage 116. As the piston 126 moves away from the neutral stage and towards the second end 110B of the housing 110, the hydraulic fluid "H" is compressed between the piston 126 and the rear end 110B of the housing 110 to create a pressurized cavity. Such pressurized cavity between the piston 126 and the rear end 110B of the housing 110 is created proximate the rear end 100B of the housing 110 and escapes into the second vertical chamber 113 to pressurize the second switch 104B in the braking stage (shown by arrows labeled "$H_2$"). In addition, the hydraulic fluid "H" that is positioned in front of the piston 126 and proximate the first end 110A of the housing 110 transitions into the first passage 115 to prevent the creation of vacuum inside of the actuator 102. Moreover, the hydraulic fluid "H" between the piston 126 and the rear end 110B of the housing 110 also transitions into brake line "BL" to create a braking force to the mechanical brakes 22A, 22B to reduce the speed of the trailer 10.

In the braking stage, the second switch 104B is pressurized due to the hydraulic fluid "H" being forced into the second vertical chamber 113 via the piston 126 creating a second pressurized state. Once the second pressurized state occurs inside of the second vertical chamber 113, the second switch 104B is provided in an open electrical stage where power (or a signal) is terminated to the controller 103 for operating the first and second motors/generators 140A, 140B. Such termination in power to the controller 103 via the second switch 104B prevents the controller 103 from applying forward torque to the wheels 20A, 20B via the first and second motors/generators 140A, 140B. In addition, the first switch 104A is provided in an unpressurized state in which the first switch 104A is also in the open electrical state. Since both the first and second switches 104A, 140B are provided in the open electrical state, the controller 103 enables the motors/generators 140A, 140B into regenerative braking during the braking stage. As such, the first and second motors/generators 140A, 140B provide braking power to the wheel 20A, 20B of the trailer 10 while capturing energy through such braking power and storing the captured energy to the energy storage device 150. The captured energy stored to the energy storage device 150 may be used to provide electrical energy to the controller 103, the first switch 104A, the second switch 104B, the first and/or second motors/generators 140A, 140B, and/or other associated electrical devices or components electrically connected to the energy storage device 150.

During the braking stage, the third switch 104C may provide additional assistance and safety to the second switch 104B. As described above, the third switch 104C is electrically connected to the braking lights of the vehicle 1. As such, the third switch 104C electrically interfaces with both the vehicle 1 and the trailer 10 during a towing operation. In the illustrated embodiment, the third switch 104C is independent of the actuator 102 such that the third switch 104C does not interact with the pressurized states caused by the actuator 102 during the accelerating and braking stages. When the towing device 100 is placed in the braking stage, the third switch 104C recognizes that a braking force is being applied by the vehicle 1 via the braking lights on the vehicle 1. As such, the third switch 104C is also placed in an open electrical stage, substantially similar to the second switch 104B, to further prevent forward torque from being applied to the wheels 20A, 20B via the first and second motors/generators 140A, 140B and to use regenerative braking. In the illustrated embodiment, the third switch 104C acts a duplicate second switch 104B in the towing device 100 in which the third switch 104C is being used as a fail-safe device when the second switch 104B is under pressure. For example, the duplication of the second switch 104B and the third switch 104C may prevent torque from being applied to the wheels 20A, 20B on the trailer 10 when a user of the vehicle 1 (i.e., the driver) is "riding the brakes" by applying a braking force on the vehicle 1 while accelerating (i.e. the user's foot is resting on the brake pedal of the vehicle 1).

The towing device 100 may also include a set of one or more sensors 160 that is electrically connected to the controller 103. The set of sensors 160 is provided on the top end 110E of the housing 100 and is directed towards the rear corners of the vehicle 1. The set of sensors 160 are positioned towards the rear corners of the vehicle 1 such that the set of sensors 160 output a set of laser beams, "$L_1$" through "$L_4$", to continuously analyze potential yaw of the trailer 10 relative to the vehicle 1. In one exemplary embodiment, the set of sensors 160 may continuously analyze potential yaw of the trailer 10 relative to the vehicle 1 at speeds of at least 10 miles per hour. The set of sensors 160 may also be positioned downwardly from the trailer 10 such that the set of sensors 160 outputs another laser beam "$L_5$" to continuously analyze potential yaw of the trailer 10.

During a towing operation, the set of sensors 160 may output continuous measurements to the controller 103 to allow the controller 103 to correct potential yaw of the trailer 10 via the first and/or second motors/generators 140A, 140B. As such, the controller 103 will correct the potential yaw of the trailer 10 if one rear corner of the vehicle 1, as measured by the set of sensors 160, is greater than or less than the distance of another rear corner of the vehicle 1, as measured by the set of sensors 160. In other words, controller 103 will correct a potential yaw of the trailer 10 if the set of sensors 160 detects that the rear corners of the vehicle 1 are at different distances relative to the trailer 10. In one exemplary embodiment, the controller 103 may correct a potential yaw by applying forward torque to the one of the first and second motors/generators 140A, 140B to align the trailer 10 to the vehicle 1 until the rear corners of the vehicle 1 are at substantially equal distance as measured by the set of sensor 160. In another exemplary embodiment, the controller 103 may correct a potential yaw by shutting off forward torque to one of the first and second motors/generators 140A, 140B and applying regenerative braking to one of the first and second motors/generators 140A, 140B to align the trailer 10 to the vehicle 1 until the rear corners of the vehicle 1 are at substantially equal distance as measured by the set of sensor 160. In yet another exemplary embodiment, the controller 103 may correct a potential yaw by applying opposing torques to the first and second motors/generators 140A, 140B (i.e., a forward torque and reverse torque) to align the trailer 10 to the vehicle 1 until the rear corners of the vehicle 1 are at substantially equal distance as measured by the set of sensor 160.

While the towing device 100 has been described and illustrated in accelerating and braking stages, the towing device 100 may also be utilized in an uphill lie stage or a prolonged uphill lie stage. In these stages, the trailer 10 and the vehicle 1 are stopped on an uphill incline (i.e. a hill) where the trailer 10 may fall backwards and away from the vehicle 1 once the vehicle 1 is at a complete stop. To prevent against using extended electrical energy in this uphill incline stage to maintain the position of the trailer 10, the towing device 100 may include two modes in which the towing device 100 and its associated components may maintain the position of the trailer 10 without using large amounts of electrical energy from the energy storage device 150. The first mode of the towing device 100 may be utilized when the trailer 10 and the vehicle 1 are stopped for a short period of time (e.g., waiting for a traffic light on an incline). In this mode, the driver of the vehicle 1 is applying a braking force on vehicle 1, which is detected by the towing device 100 via the third switch 104C. In this mode, the first, second, and third switches 104A, 104B, 104C remain in the open electrical stage where no torque is being applied to the wheels 20A, 20B, via the first and second motors/generators 140A, 140B, until the brakes of the vehicle 1 are released by the driver. The second mode of the towing device 100 may be utilized when the vehicle 1 and the trailer 10 are parked in a prolonged uphill lie stage. In this mode, the controller 103 will apply a timer for a predetermined time when the controller 103 reads no movement in the actuator 102, via the first, second, and third switches 104A, 104B, 104C, or no movement of the wheels 20A, 20B, via the first and second motors/generators 140A, 140B. In this mode, the towing device 100 is placed in a "sleep mode" where the towing device 100 is not utilizing any electrical energy to maintain the position of the trailer 10 since the position of the trailer 10 is being maintained by the braking force of the vehicle 1. The towing device 100 may be "woken up" and turned on once the mechanical brakes 22 are applied on the vehicle 1, as detected by the third switch 104C, or movement is detected in the actuator 102 and/or the wheels 20A, 20B.

The towing device 100 may also include a breakaway safety line (not illustrated) that is operably attached from the actuator 102 to the vehicle 1. During separation of the trailer 10 from the vehicle 1, the breakaway safety line manually actuates the mechanical brakes 22A, 22B on the trailer 10 to stop the forward motion of the trailer 10. As such, the breakaway safety line is substantially similar to a breakaway safety line used on legacy surge braking actuators for stopping a separated trailer. The breakaway safety line of the towing device 100 may also electrically open each of the first and second switches 104A, 104B to provide regenerative braking to the trailer 10 if the trailer 10 is separated from the vehicle 1 during a towing operation.

While the controller 103 may control the first and second motors/generators 140A, 140B via the inputs provided by the first, second, and third switches 104A, 104B, and 104C, a towing device may omit a controller and solely rely upon at least one motor/generator to control and/or operate a trailer based on inputs from either first, second, or third switches. In one exemplary embodiment, a first switch of a towing device may be operably connected to at least one motor/generator on a trailer where the at least one motor/generator may provide forward torque and/or acceleration to at least one wheel on the trailer based on pressure inputs from the first switch. In another exemplary embodiment, a second switch of a towing device may be operably connected to at least one motor/generator on a trailer where the at least one motor/generator may provide regenerative braking and/or a reverse torque to at least one wheel on the trailer based on pressure inputs from the second switch. In another exemplary embodiment, first and second switches of a towing device may be operably connected to at least one motor/generator on a trailer where the at least one motor/generator may provide torque to first and second wheels on the trailer based on pressure inputs from the first and second switches.

The towing device 100 may also be controlled via a software application through a computer or a smartphone device. The software application will be operably connected to the towing device 100, specifically to the first switch 104A through the controller 103, for allowing the trailer 10 to move independently of the vehicle 1 via the first and second motors/generators 140A, 140B. As such, the towing device 100 may be controlled by a user to move the trailer 10 forwards and/or backwards when disconnected from the vehicle 1 depending on a user's input through the software application. In addition, the software application may control the towing device 100 to apply variable torque between the first and second motors/generators 140A, 140B for turning the trailer 10 depending on the user's input through the software application. As such, the software application allows a user to move the trailer 10 around corners or to pivot the trailer 10 about itself without being operably connected to the vehicle 1. In other words, the movement of the wheels 20A, 20B may be powered asynchronously such that the first and second motors/generators 140A, 140B may apply different amounts of torque and different rotations of torque onto the wheels 20A, 20B at different time intervals when the trailer 10 is turning around a corner or is pivoting about itself.

Further, the software application may include multiple modes and/or methods for controlling the trailer 10 in certain situations. In one exemplary embodiment, the software application implemented into the towing device 100 may include a "slow speed" mode and/or method that is able to detect forward speeds that are less than three miles per hour via the first and second motors/generators 140A, 140B.

In this mode, the controller 103 will able to apply variable torque to each of the wheels 20A, 20B asynchronously, via the first and second motors/generators 140A, 140B, depending on the forward and reverse speeds of the wheels 20A, 20B. As such, the controller 103 may apply greater torque to either of the first and second wheels 20A, 20B based on the size of the turning radius determined by the set of sensors 160 on the towing controller 100. Such variable and asynchronous torque applied to the first and second wheels 20A, 20B prevents against "pushing" of the trailer 10 along a straight line that is tangential to the anticipated turning radius. This mode also helps reduce potential tire wear on the wheels 20A, 20B on the trailer 10.

In another exemplary embodiment, the software application implemented into the towing device 100 may include a "reverse" mode when moving the trailer 10 backwards up an incline or over soft and/or uneven terrain. In this mode, the controller 103 would apply a suitable amount of torque to the wheels 20A, 20B, via the first and second motors/generators 140A, 140B, that would bypass the braking force between the actuator 102 and the mechanical brakes 22A, 22B. In this mode, the second switch 104B would act substantially similar to the first switch 104A by applying variable power to the controller 103 to variably apply torque to the first and second wheels 20A, 20B. In addition, the third switch 104C is disabled during this mode due to the driver "riding" the brakes of the vehicle 1 during a reverse maneuver of the trailer 10. Moreover, the set of laser sensors 160 may detect the direction of the trailer 10, via the laser beams "$L_1$" through "$L_5$", so that the controller 103 may apply variable torque to the first and second wheels 20A, 20B to keep the trailer 10 aligned with the vehicle 1. Once the driver of the vehicle 1 ceases the reverse maneuvering and initiates forward movement, the "reverse" mode is automatically canceled.

The software application may also be able to operably control a dolly wheel (not illustrated) that may be a part of the trailer 10. Here, the software application may be electrically connected to a motor (not illustrated) that is provided on the trailer 10 for operably raising and/or lowering the dolly wheel for ease of connecting and/or disconnecting to the vehicle 1. In addition, the software application may be separately used in conjunction with a backup camera (if provided on the vehicle 1) when the user of the trailer 10 is connecting the trailer 10 to the vehicle 1. In addition, the motor that is operably connected to the dolly wheel may also be operably connected to the controller 103 of the towing device 100.

The software application may also be able to monitor and provide certain data and information of the trailer 10 to the user. In one exemplary embodiment, an energy consumption indicator and/or a remaining energy power indicator may be provided in the software application to calculate and display the total energy available in the energy storage device 150. In another exemplary embodiment, the software application may be able to monitor and indicate the speed of the trailer 10 when connected to or disconnected from the vehicle 1. In another exemplary embodiment, the software application may be able to be mated to and operated from a smart screen resident provided in the vehicle 1 via short-range wireless technology (e.g, Bluetooth technology).

While the towing device 100 is included on the trailer 10, the towing device 100 may be provided on any suitable trailer stated herein. In other words, the towing device 100 is moveable from one trailer, such as trailer 10, to a different trailer. As such, the towing device 100, with the potential inclusion of the first and second motors/generators 140A, 140B, the energy storage device 150, one or more sensors 160, is able to be moved from one trailer to different trailer based on the user's desire.

Figure 8:
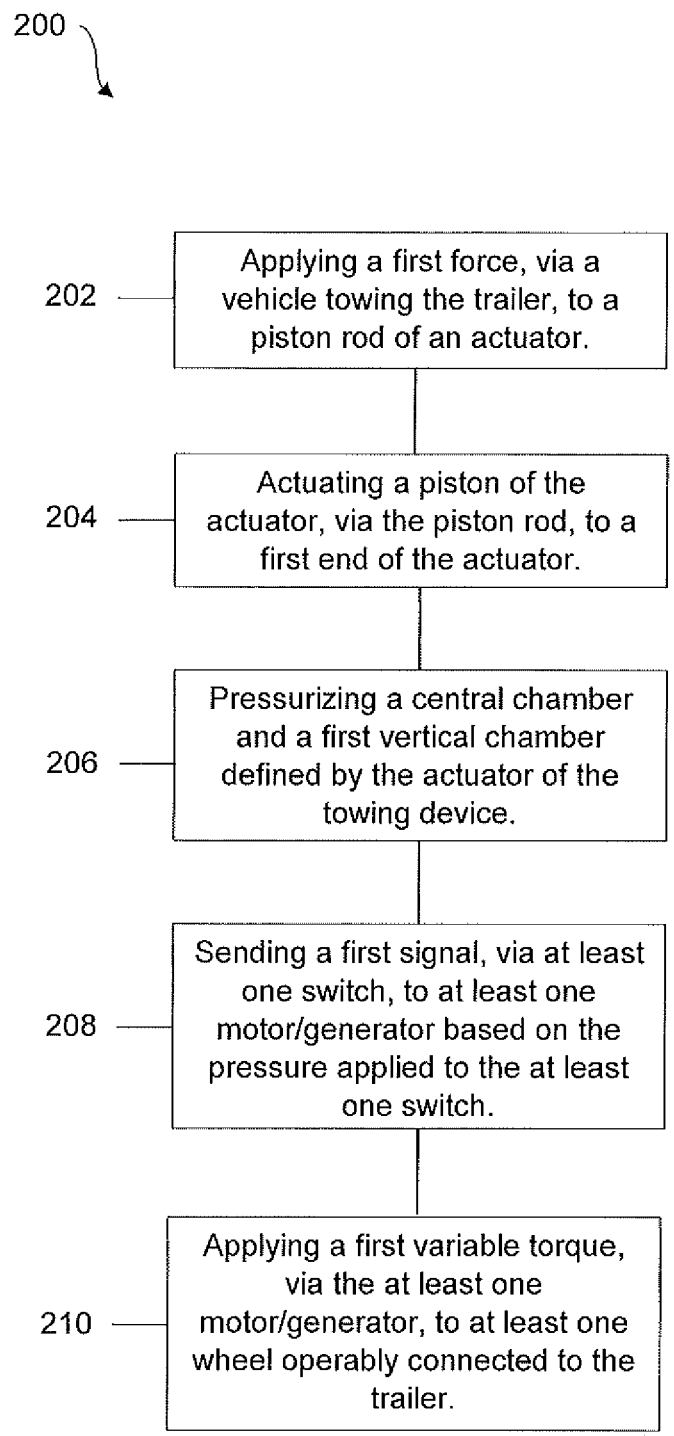
FIG. 8 illustrates an exemplary method flow chart for controlling a trailer via a towing device.

FIG. 8 illustrates a method 200 of controlling a trailer via a towing device. An initial step 202 comprises applying a first force, via a vehicle towing the trailer, to a piston rod of an actuator of the towing device. Another step 204 comprises actuating a piston of the actuator, via the piston rod, to a first end of the actuator of the towing device. Another step 206 comprises pressurizing a central chamber and a first vertical chamber defined by the actuator of the towing device, wherein at least one switch is disposed inside of the first vertical chamber. Another step 208 comprises sending a first signal, via the at least one switch, to at least one motor/generator based on the pressure being applied to the at least one switch. Another step 210 comprises applying a first variable torque, via the at least one motor/generator, to at least one wheel operably connected to the trailer.

In an exemplary embodiment, method 200 may include additional steps for controlling a trailer via a towing device. An optional step may include sending the first signal, via the at least one switch, to a controller based on the pressure being applied to the first switch. Another optional step may include moving a volume of hydraulic fluid into a first passage of a fluid reservoir of the actuator of the towing device. Another optional step may include applying a second opposing force, via the vehicle towing the trailer, to the piston rod of the actuator of the towing device. Another optional step may include actuating the piston of the actuator, via the piston rod, to a second opposing end of the actuator of the towing device. Another optional step may include pressurizing the central chamber and a second vertical chamber of the actuator of the towing device, wherein a second switch of the at least one switch is disposed inside of the second vertical chamber. Another optional step may include sending a second signal, via the second switch, to a controller based on the pressure being applied to the second switch. Another optional step may include applying an opposed second variable torque, via the at least one motor/generator, to the at least one wheel operably connected to the trailer. Another optional step may include moving a volume of the hydraulic fluid into a second passage of a fluid reservoir of the actuator of the towing device. Another optional step may include storing electrical energy to an on-board energy storage device by capturing electrical energy from one of the first and second motors/generators. Another optional step may include correcting yaw of longitudinal and transverse axes of the trailer, via a set of sensors, measured relative to the rear corners of the vehicle. The step of applying a first variable torque, via the at least one motor/generator, to at least one wheel operably connected to the trailer is accelerating torque caused by the at least one motor/generator. The step of applying an opposed second variable torque, via the at least one motor/generator, to at least one wheel operably connected to the trailer is regenerative braking caused by the at least one motor/generator.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or stage to indicate that the value and/or stage described is within a reasonable expected range of values and/or stages. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A towing device operably engaged with a trailer, comprising: an actuator operably connected with the trailer; wherein the actuator further comprises: a housing having a first end, a second opposing end, and a central chamber defined by the housing that extends between the first and second ends of the housing; a piston moveably disposed inside of the central chamber defined by the housing; a piston rod operably connected to the piston for moving the piston inside of the central chamber, wherein the piston rod operably engages a coupler of the trailer; and at least one switch provided in the actuator and operable to variably control at least one motor/generator provided on the trailer; wherein the at least one switch is operable to send a first signal to the at least one motor/generator via a first force exerted on the actuator by a vehicle, and wherein a first torque is applied to at least one wheel on the trailer via the at least one motor/generator being operably engaged with the at least one wheel.

2. The towing device of claim 1, further comprising:
a controller operably connected to the at least one switch and to the at least one motor/generator, wherein the controller is operable to control the torque applied by the at least one motor/generator when the at least one switch sends the first signal.

3. The towing device of claim 1, further comprising:
a fluid reservoir operably connected to the actuator that is in fluid communication with the central chamber defined by the housing, the fluid reservoir having first and second passages for allowing fluid into a first location and an opposed second location inside of the central chamber.

4. The towing device of claim 3, wherein the at least one switch further comprises:
a second switch provided in the actuator and operable to variably control the at least one motor/generator, wherein the second switch is operable to send a second signal to the at least one motor/generator via an opposed second force exerted on the actuator by a vehicle, and wherein an opposed second torque is applied to the at least one wheel on the trailer via the at least one motor/generator.

5. The towing device of claim 2, wherein the at least one switch further comprises:
a third switch provided on the actuator and operably connected to the at least one motor/generator and the vehicle, wherein the third switch sends a third signal to the controller via a braking force applied by the vehicle, wherein torque is prevented to the at least one wheel on the trailer via the at least one motors/generators.

6. The towing device of claim 4, wherein the at least one switch is provided proximate to the first end of the housing and is disposed inside of a first vertical chamber that is in fluid communication with the central chamber; and wherein the second switch is provided proximate to the second end of the housing inside of a second vertical chamber and is in fluid communication with the central chamber.

7. The towing device of claim 1, wherein the actuator further comprises:
a biaser operably connected to the piston rod, the biaser is operable for biasing the piston such that the piston fails to apply any pressurized cavities inside the central chamber of the housing when the actuator is free of any force exerted by the vehicle.

8. The towing device of claim 1, further comprising: a set of sensors provided on the towing device and operably connected to the controller for correcting the yaw of the trailer, wherein the set of sensors is directed towards the rear corners of the vehicle for preventing yaw of longitudinal and transverse axes defined by the trailer measured relative to the rear corners of the vehicle.

9. A method of controlling a trailer via a towing device, the method comprising:
applying a first force, via a vehicle towing the trailer, to a piston rod of an actuator of the towing device;
actuating a piston of the actuator, via the piston rod, to a first end of the actuator of the towing device;
pressurizing a central chamber and a first vertical chamber defined by the actuator of the towing device, wherein at least one switch is disposed inside of the first vertical chamber;
sending a first signal, via the at least one switch, to at least one motor/generator based on the pressure being applied to the at least one switch; and
applying a first variable torque, via the at least one motor/generator, to at least one wheel operably connected to the trailer.

10. The method of claim 9, further comprising:
sending the first signal, via the at least one switch, to a controller based on the pressure being applied to the first switch.

11. The method of claim 9, further comprising:
moving a volume of hydraulic fluid into a first passage of a fluid reservoir of the actuator of the towing device.

12. The method of claim 9, further comprising:
applying a second opposing force, via the vehicle towing the trailer, to the piston rod of the actuator of the towing device.

13. The method of claim 12, further comprising:
actuating the piston of the actuator, via the piston rod, to a second opposing end of the actuator of the towing device.

14. The method of claim 13, further comprising:
pressurizing the central chamber and a second vertical chamber of the actuator of the towing device, wherein a second switch of the at least one switch is disposed inside of the second vertical chamber.

15. The method of claim 14, further comprising:
sending a second signal, via the second switch, to a controller based on the pressure being applied to the second switch.

16. The method of claim 15, further comprising:
applying an opposed second variable torque, via the at least one motor/generator, to the at least one wheel operably connected to the trailer.

17. The method of claim 16, further comprising:
moving a volume of the hydraulic fluid into a second passage of a fluid reservoir of the actuator of the towing device.

18. The method of claim 15, further comprising:
storing electrical energy to an on-board energy storage device by capturing electrical energy from one of the first and second motors/generators.

19. The method of claim 9, further comprising:
correcting yaw of longitudinal and transverse axes of the trailer, via a set of sensors, measured relative to the rear corners of the vehicle.

* * * * *